(12) United States Patent
Aoki (10) Patent No.: US 10,613,324 B2
(45) Date of Patent: Apr. 7, 2020

(54) VEHICLE DISPLAY DEVICE

(71) Applicant: Yazaki Corporation, Tokyo (JP)

(72) Inventor: Kunimitsu Aoki, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/946,784

(22) Filed: Apr. 6, 2018

(65) Prior Publication Data

US 2018/0299674 A1 Oct. 18, 2018

(30) Foreign Application Priority Data

Apr. 12, 2017 (JP) .................................. 2017-079157

(51) Int. Cl.
 *G02B 27/01* (2006.01)
 *G02B 27/10* (2006.01)
 *B60K 35/00* (2006.01)

(52) U.S. Cl.
 CPC .......... *G02B 27/0101* (2013.01); *B60K 35/00* (2013.01); *G02B 27/0149* (2013.01); *G02B 27/108* (2013.01); *B60K 2370/334* (2019.05); *B60R 2300/205* (2013.01)

(58) Field of Classification Search
 CPC ............ G02B 27/0101; G02B 27/0149; B60K 35/00; B60K 2350/2052; B60R 2300/205
 USPC ......................................................... 359/630
 See application file for complete search history.

(56) References Cited

U.S. PATENT DOCUMENTS 3,603,667 A * 9/1971 Freeman ............ G02B 27/0101
 345/7
2014/0293431 A1* 10/2014 Ishimoto ................ G03B 21/16
 359/630

FOREIGN PATENT DOCUMENTS

| JP | 2016-071051 A | 5/2016 | |
| WO | WO 2014087085 A1 * | 6/2014 | ............ G02B 27/01 |
| WO | 2015/125247 A1 | 8/2015 | |

OTHER PUBLICATIONS

Machine Translation of WO 2014087085 A1 (Year: 2014).*

* cited by examiner

*Primary Examiner* — Jerry L Brooks
(74) *Attorney, Agent, or Firm* — Sughrue Mion, PLLC (57) ABSTRACT

A vehicle display device includes: a projector that emits display light corresponding to a display image to be visually recognized by a driver of a vehicle; a screen on which the display image corresponding to the display light emitted from the projector is projected and that reflects the display light; and an aspheric mirror reflecting reflection light of the display light reflected by the screen toward a windshield of the vehicle. The aspheric mirror has a non-reflection area on a part of a reflection surface reflecting the reflection light toward the windshield. The projector is arranged at a position facing the screen with the aspheric mirror interposed therebetween such that the display light passes through the non-reflection area and is directed to the screen.

10 Claims, 8 Drawing Sheets

VEHICLE DISPLAY DEVICE

CROSS-REFERENCE TO RELATED APPLICATION(S)

The present application claims priority to and incorporates by reference the entire contents of Japanese Patent Application No. 2017-079157 filed in Japan on Apr. 12, 2017.

BACKGROUND OF THE INVENTION

1. Field of the Invention

The present invention relates to a vehicle display device.

2. Description of the Related Art

Conventionally, there is a vehicle display device such as a head-up display (HUD) device that displays a virtual image in front of a driver via a windshield of a vehicle. For example, Japanese Patent Application Laid-open No. 2016-71051 discloses a vehicle display device which includes a display that displays an image on a display surface oriented toward the front side and a reflective member arranged on an optical path between the display and a windshield.

In the conventional vehicle display device, however, the display is arranged at a position away from the reflective member in consideration of the optical path from the display to the windshield, and the respective parts occupy a space so that there is room for improvement regarding reduction in size.

SUMMARY OF THE INVENTION

An object of the invention is to provide a vehicle display device that can be easily reduced in size.

In order to solve the above mentioned problem and achieve the object, a vehicle display device according to one aspect of the present invention includes a projector that emits display light corresponding to a display image to be visually recognized by a driver of a vehicle; a projected member on which the display image corresponding to the display light emitted from the projector is projected and that reflects the display light; and a reflection mirror that reflects reflection light of the display light reflected by the projected member toward a windshield of the vehicle, wherein the reflection mirror is provided with a non-reflection area on a part of a reflection surface that reflects the reflection light toward the windshield, and the projector is arranged at a position facing the projected member with the reflection mirror interposed therebetween such that the display light passes through the non-reflection area and is directed to the projected member.

According to another aspect of the present invention, in the vehicle display device, it is preferable that the non-reflection area has a through-hole penetrating from a surface opposite to the reflection surface toward the reflection surface or a notch formed from an end of the reflection mirror toward a center of the reflection surface.

According to still another aspect of the present invention, in the vehicle display device, it is preferable that the projector has three light sources that emit laser beams having mutually different wavelengths, and the three light sources are arranged on a plane orthogonal to an emission hole through which a laser beam corresponding to the display image is emitted.

According to still another aspect of the present invention, in the vehicle display device, it is preferable that the projected member has a plane or a curved surface formed in a convex shape toward the reflection mirror.

According to still another aspect of the present invention, in the vehicle display device, it is preferable that the projector has a surface having an emission hole through which the display light is emitted, the surface being arranged in close contact with a surface of the reflection mirror opposite to the reflection surface.

According to still another aspect of the present invention, in the vehicle display device, it is preferable that the projector has a first convex portion formed so as to surround an emission hole through which the display light is emitted, and the reflection mirror has a through-hole, that penetrates from a surface opposite to the reflection surface toward the reflection surface, at a position facing the emission hole, and a first concave portion that is fitted with the first convex portion is formed so as to surround the through-hole, or alternatively, the projector has a second concave portion formed so as to surround the emission hole, and the reflection mirror has a second convex portion that is fitted with the second concave portion is formed so as to surround the through-hole.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of a vehicle display device according to the invention will be described in detail with reference to the drawings. Incidentally, the invention is not limited by the embodiments. In addition, constituent elements in the following embodiments include constituent elements which can be easily assumed by those skilled in the art or substantially identical constituent elements. In addition, the various omissions, substitutions, and modifications of the constituent elements in the following embodiments can be made in the scope not departing from a gist of the invention.

First Embodiment

Figure 1:
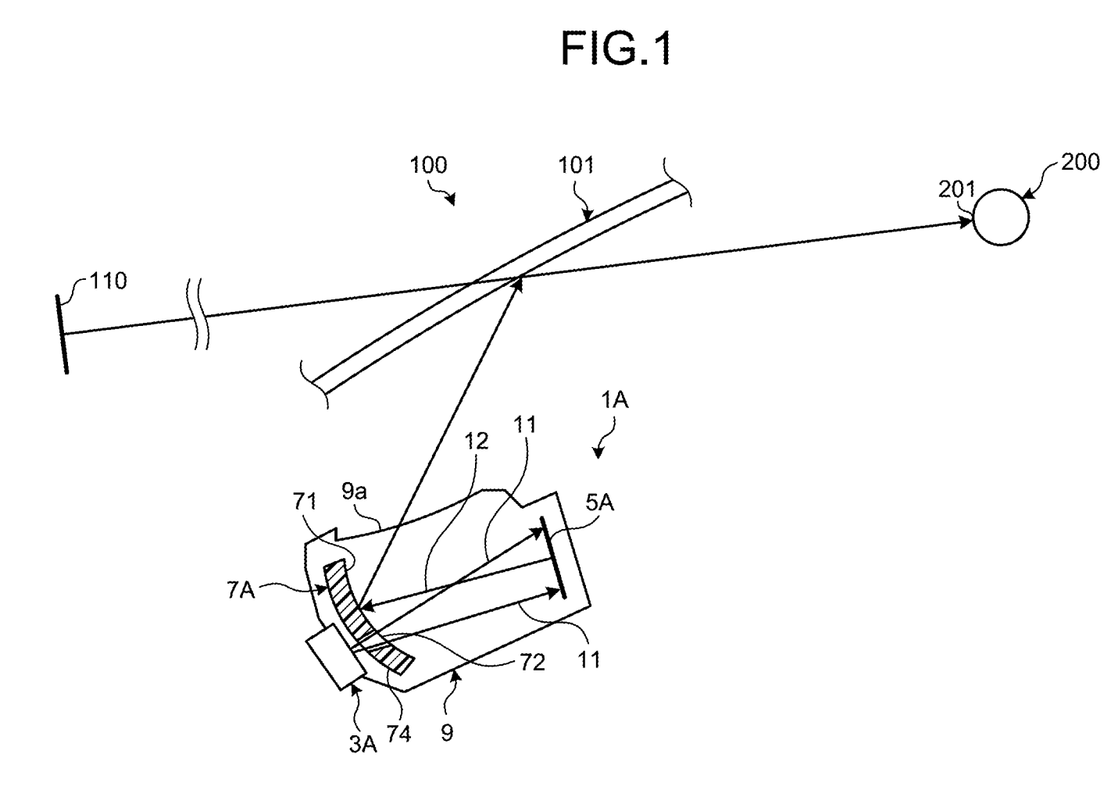
FIG. 1 is a view illustrating a schematic configuration of a vehicle display device according to a first embodiment.
Figure 2:
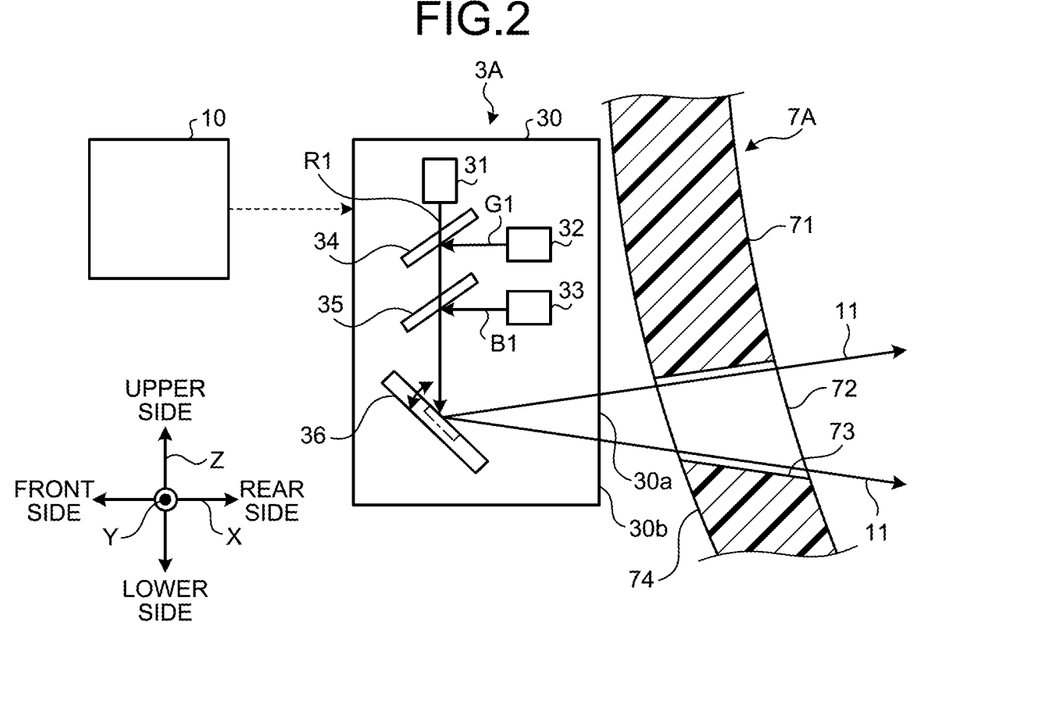
FIG. 2 is a view illustrating a schematic configuration of a projector according to the first embodiment.
Figure 3:
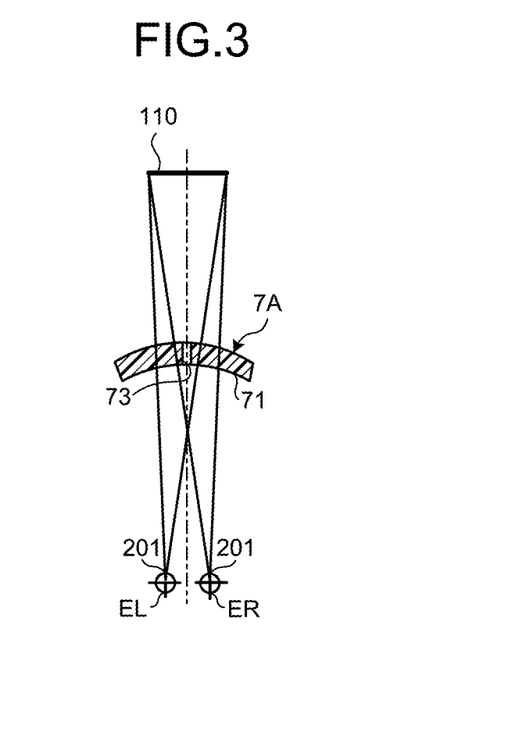
FIG. 3 is a view for describing an appearance of a virtual image in the vehicle display device according to the first embodiment.
Figure 4A:
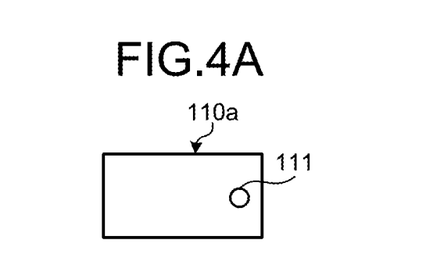
FIGS. 4A to 4C are views for describing a difference in the appearance of the virtual image in the vehicle display device according to the first embodiment.
Figure 4B:
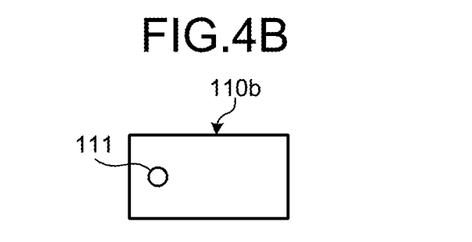
Figure 4C:
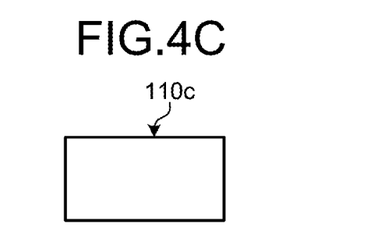

FIG. 1 is a view illustrating a schematic configuration of a vehicle display device according to a first embodiment. FIG. 2 is a view illustrating a schematic configuration of a projector according to the first embodiment. FIG. 3 is a view for describing an appearance of a virtual image in the vehicle display device according to the first embodiment. FIGS. 4A to 4C are views for describing a difference in the appearance of the virtual image in the vehicle display device according to the first embodiment. Incidentally, FIG. 1 illustrates a positional relationship of the respective elements when a vehicle on which the vehicle display device is mounted is viewed from the side. FIG. 3 illustrates an appearance from a proper viewing position in the vehicle on which the vehicle display device is mounted. FIG. 4A illustrates a virtual image viewed with a left eye of a driver, FIG. 4B illustrates a virtual image viewed with a right eye of the driver, and FIG. 4C illustrates a virtual image viewed with both the eyes of the driver. In addition, the X direction in the drawing indicates a front-rear direction of the projector according to this embodiment. The Y direction in the drawing indicates a right-left direction of the projector according to this embodiment. The Z direction in the drawing indicates an up-down direction of the projector according to this embodiment. Incidentally, the up-down direction is not limited to the vertical direction.

As illustrated in FIG. 1, a vehicle display device 1A according to the first embodiment is, for example, a head-up display (HUD) device mounted on a vehicle 100 such as an automobile. The vehicle display device 1A is arranged inside a dashboard (not illustrated) of the vehicle 100 and projects various display images relating to the vehicle 100 to a windshield 101 of the vehicle 100. The various display images relating to the vehicle include information configured to support driving of a driver 200. The vehicle display device 1A projects the display image on the windshield 101 and displays a virtual image 110 in front of an eye point 201 of the vehicle 100. The windshield 101 is positioned in front of the eye point 201. The windshield 101 is semi-transmissive and reflects light incident from the vehicle display device 1A toward the eye point 201. The eye point 201 is a predetermined position as a viewpoint position of the driver (operator) 200 seated on a driver's seat (not illustrated). The driver 200 recognizes the display image reflected by the windshield 101 as the virtual image 110. For the driver 200, the virtual image 110 is recognized as if existing in front of the windshield 101. The vehicle display device 1A includes a projector 3A, a screen 5A, an aspheric mirror 7A, and a housing 9.

The projector 3A is a projection device. The projector 3A is arranged at a position facing the screen 5A with the aspheric mirror 7A interposed therebetween. The projector 3A emits display light 11 corresponding to the display image to be visually recognized by the driver 200 of the vehicle 100. The projector 3A projects the display image on the screen 5A by emitting the display light 11 toward the screen 5A which is arranged at the position facing the projector 3A with the aspheric mirror 7A interposed therebetween. The projector 3A is housed in the housing 9 so as to be partially exposed to the outside of the vehicle display device 1A. The projector 3A includes a housing 30, a first light source 31, a second light source 32, a third light source 33, dichroic mirrors 34 and 35, and a scanning mirror 36.

The housing 30 has a rectangular parallelepiped shape. The housing 30 houses the first to third light sources 31, 32, and 33, the dichroic mirrors 34 and 35, and the scanning mirror 36. The housing 30 includes an emission hole 30a through which the display light 11 is emitted and a surface 30b having the emission hole 30a.

The projector 3A has three light sources that emit laser beams having mutually different wavelengths. That is, the first light source 31 is, for example, a laser diode that emits a red laser beam. The first light source 31 is arranged so as to emit the red laser beam toward the lower side in the Z direction as illustrated in FIG. 2. The dichroic mirror 34 is irradiated with the red laser beam. The second light source 32 is a laser diode that generates a green laser beam having a wavelength different from that of the red laser beam. The second light source 32 is arranged so as to emit the green laser beam toward the front side in the X direction as illustrated in FIG. 2. The dichroic mirror 34 is irradiated with the green laser beam. The third light source 33 is a laser diode that generates a blue laser beam different from the red laser beam and the green laser beam. The third light source 33 is arranged so as to emit the blue laser beam toward the front side in the X direction, which is similar to the second light source 32. The dichroic mirror 35 is irradiated with the blue laser beam. The first light source 31, the second light source 32, and the third light source 33 in this embodiment are arranged such that an optical axis R1 of the red laser beam is orthogonal to optical axes G1 and B1 of the green laser beam and the blue laser beam.

The dichroic mirror 34 transmits the red laser beam and reflects the green laser beam. The red laser beam and the green laser beam reflected by the dichroic mirror 34 are multiplexed to form a laser beam on the same optical axis, and this laser beam is incident on the dichroic mirror 35. The dichroic mirror 35 transmits the multiplexed red laser beam and green laser beam and reflects the blue laser beam. The red laser beam and the green laser beam are multiplexed with the blue laser beam reflected by the dichroic mirror 35 to form the display light 11 on the same optical axis, and this display light 11 is incident on the scanning mirror 36.

The scanning mirror 36 is arranged to intersect an optical axis R1 of the red laser beam emitted from the first light source 31. The scanning mirror 36 is, for example, a micro electro mechanical system (MEMS) mirror using a MEMS technology. The MEMS mirror is an optical device in which mechanical element parts, sensors, actuators, electronic circuits, and the like are integrated on a semiconductor substrate. The scanning mirror 36 according to this embodiment is driven to project the display image on the screen 5A by reflecting the display light 11 toward the screen 5A while rotating and oscillating around two rotary shafts (not illustrated) orthogonal to each other.

The screen 5A is a projected member. The screen 5A is formed in a planar shape as a whole and is arranged at a position facing the projector 3A with the aspheric mirror 7A interposed therebetween. The display image corresponding to the display light 11 emitted from the projector 3A is projected on the screen 5A, and the screen 5A reflects the display light 11. The screen 5A is configured of, for example, a reflective microlens array, a diffusion plate, and the like.

The aspheric mirror 7A is a reflection mirror. The aspheric mirror 7A is arranged on an optical path between the projector 3A and the screen 5A. The aspheric mirror 7A reflects reflection light 12 of the display light 11 reflected by the projector 3A toward the windshield 101 of the vehicle 100. The aspheric mirror 7A has an aspheric surface formed in a concave shape toward the windshield 101. This aspheric surface forms a reflection surface 71 that reflects the reflection light 12 toward the windshield 101. In the aspheric mirror 7A, a non-reflection area 72 is provided on a part of the reflection surface 71. The non-reflection area 72 has a through-hole 73 that penetrates from a surface 74 opposite to the reflection surface 71 toward the reflection surface 71. The through-hole 73 is provided, for example, at a vertex of the aspheric surface formed in the concave shape. Incidentally, a position at which the through-hole 73 is provided is not limited to the vertex of the aspheric surface. The projector 3A according to this embodiment is arranged such that the display light 11 passes through the non-reflection area 72 and is directed to the screen 5A.

The housing 9 is assembled with various parts forming the vehicle display device 1A, such as the projector 3A and the aspheric mirror 7A, thereby forming a case that houses these parts. The housing 9 is made of an insulating resin material or the like. The housing 9 has a transparent cover 9a on a surface facing the windshield 101. The windshield 101 is irradiated with the reflection light 12 reflected by the aspheric mirror 7A via the transparent cover 9a.

The vehicle display device 1A includes a controller 10 that controls the projector 3A. The controller 10 controls a light amount and a color of the display light 11 emitted from the projector 3A by controlling the first to third light sources 31 to 33 and the scanning mirror 36. The controller 10 controls the output of the laser beam of each light source, for example, based on target values of the light amount and color of the display light 11.

Since the aspheric mirror 7A has the through-hole 73 in the non-reflection area 72 in the vehicle display device 1A having the above-described configuration, the virtual image 110 visually recognized by the eye point 201 of the driver 200 is different between a left eye EL and a right eye ER due to the binocular parallax as illustrated in FIG. 3. For example, when the through-hole 73 is provided at the vertex of the aspheric surface, a virtual image 110a viewed with the left eye EL has a display defect portion 111 on the right side of the image as illustrated in FIG. 4A. On the other hand, a virtual image 110b viewed with the right eye ER has the display defect portion 111 on the left side of the image as illustrated in FIG. 4B. However, the driver 200 generally views the virtual image 110 displayed in front of the eye point 201 with both the eyes, and thus, hardly visually recognizes the display defect portion 111 on a virtual image 110c as illustrated in FIG. 4C.

As described above, the vehicle display device 1A according to this embodiment includes: the projector 3A that emits the display light 11 corresponding to the display image to be visually recognized by the driver 200 of the vehicle 100; the screen 5A on which the display image corresponding to the display light emitted from the projector 3A is projected and that reflects the display light; and the aspheric mirror 7A that reflects the reflection light 12 of the display light 11 reflected by the screen 5A toward the windshield 101 of the vehicle 100. The aspheric mirror 7A has the non-reflection area 72 on a part of the reflection surface 71 that reflects the reflection light 12 toward the windshield 101. The projector 3A is arranged at the position facing the screen 5A with the aspheric mirror 7A interposed therebetween such that the display light 11 passes through the non-reflection area 72 and is directed to the screen 5A.

According to the vehicle display device 1A having the above-described configuration, it is possible to arrange the projector 3A and the aspheric mirror 7A collectively in one place such that the optical path from the projector 3A to the windshield 101 partially overlaps, and thus, it is possible to easily reduce a size of the vehicle display device 1A and to improve the mountability to the vehicle 100.

In addition, the non-reflection area 72 has the through-hole 73 penetrating from the surface 74 opposite to the reflection surface 71 toward the reflection surface 71 in the vehicle display device 1A according to this embodiment, and thus, it is possible to project the display image from the projector 3A toward the screen 5A even when the projector 3A is arranged at the position facing the screen 5A with the aspheric mirror 7A interposed therebetween.

Although the above-described embodiment has been described assuming that the projector 3A has the three light sources that emit the laser beams having the mutually different wavelengths (R, G, and B), the invention is not limited thereto, and a single light source may be used.

In addition, the projector 3A multiplexes the plurality of laser beams by the plurality of dichroic mirrors 34 and 35 to generate the display light 11 in the above-described embodiment, but the invention is not limited to these optical systems as long as an optical system can multiplex a plurality of laser beams.

In addition, the non-reflection area 72 has the through-hole 73 in the above-described embodiment, but the invention is not limited thereto. For example, the aspheric mirror 7A may be made of a transparent resin or glass so as to perform reflection processing on the reflection surface 71 and performs non-reflection processing on the non-reflection area 72 such that the display light 11 passes through the non-reflection area 72. Alternatively, a reflectance of the non-reflection area 72 may be changed such that the reflectance of the non-reflection area 72 is lower than a reflectance of the reflection surface 71. Alternatively, a fine hole may be formed in the non-reflection area 72 to form a half mirror.

Modification of First Embodiment

Figure 5:
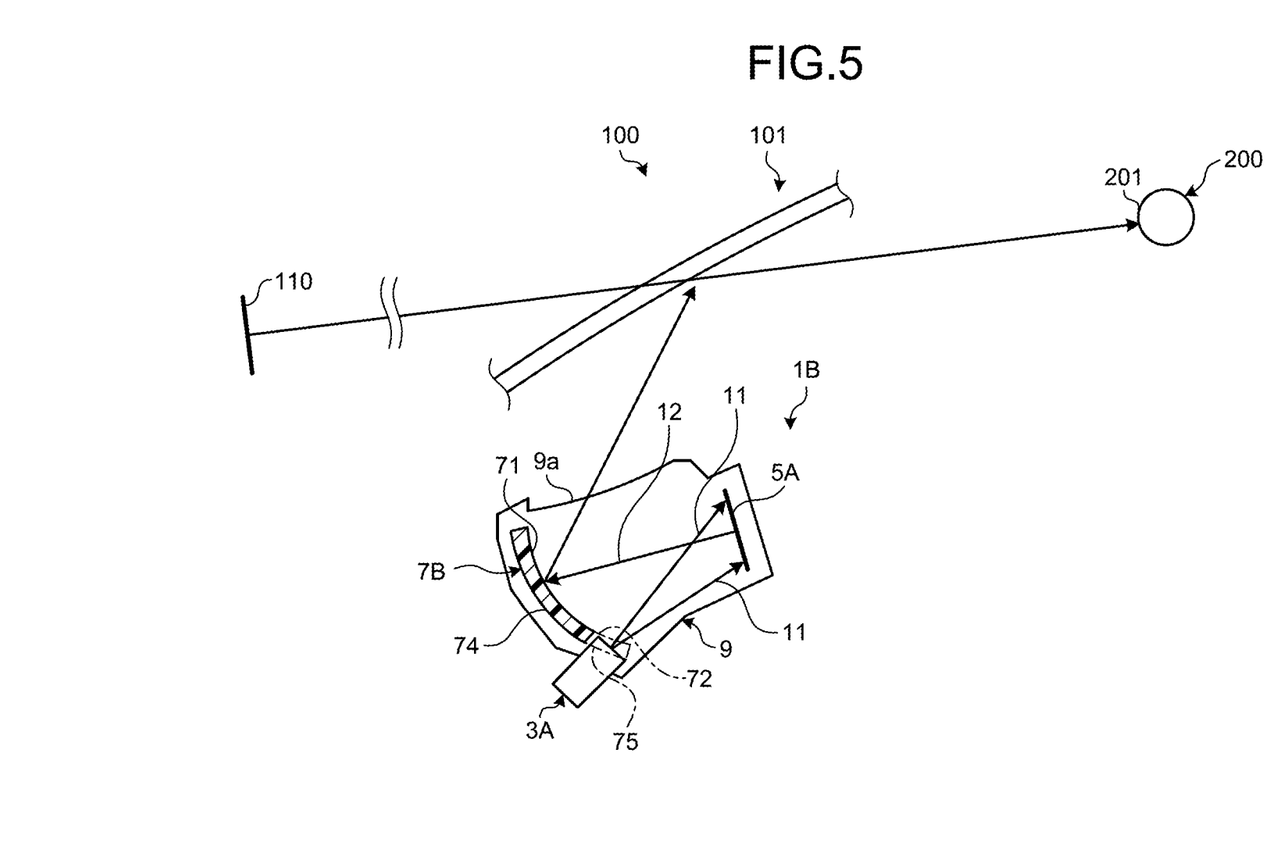
FIG. 5 is a view illustrating a schematic configuration of a vehicle display device according to a modification of the first embodiment.

A modification of the above-described first embodiment will be described with reference to FIG. 5. FIG. 5 is a view illustrating a schematic configuration of a vehicle display device according to the modification of the first embodiment.

A vehicle display device 1B according to this modification of the embodiment is different from the vehicle display device 1A in terms that the non-reflection area 72 has a notch 75 formed from an end of an aspheric mirror 7B toward a center of the reflection surface 71 instead of the through-hole 73. The projector 3A according to this modification is arranged such that the display light 11 passes through the notch 75 and is directed to the screen 5A. Here, the center of the reflection surface 71 is, for example, a vertex of an aspheric surface formed in a concave shape.

According to the vehicle display device 1B having the above-described configuration, the same effects as those of the above-described first embodiment are obtained. In addition, for example, even when sunlight enters the housing 9 via the transparent cover 9a, the vehicle display device 1B can prevent so-called ghost light since incidence angles of the display light 11 and the sunlight are different from each other so that the sunlight is not directed to the aspheric mirror 7B again, and it is possible to make it easier to take measures against wash out by reducing interference of the sunlight.

Second Embodiment

Figure 6:
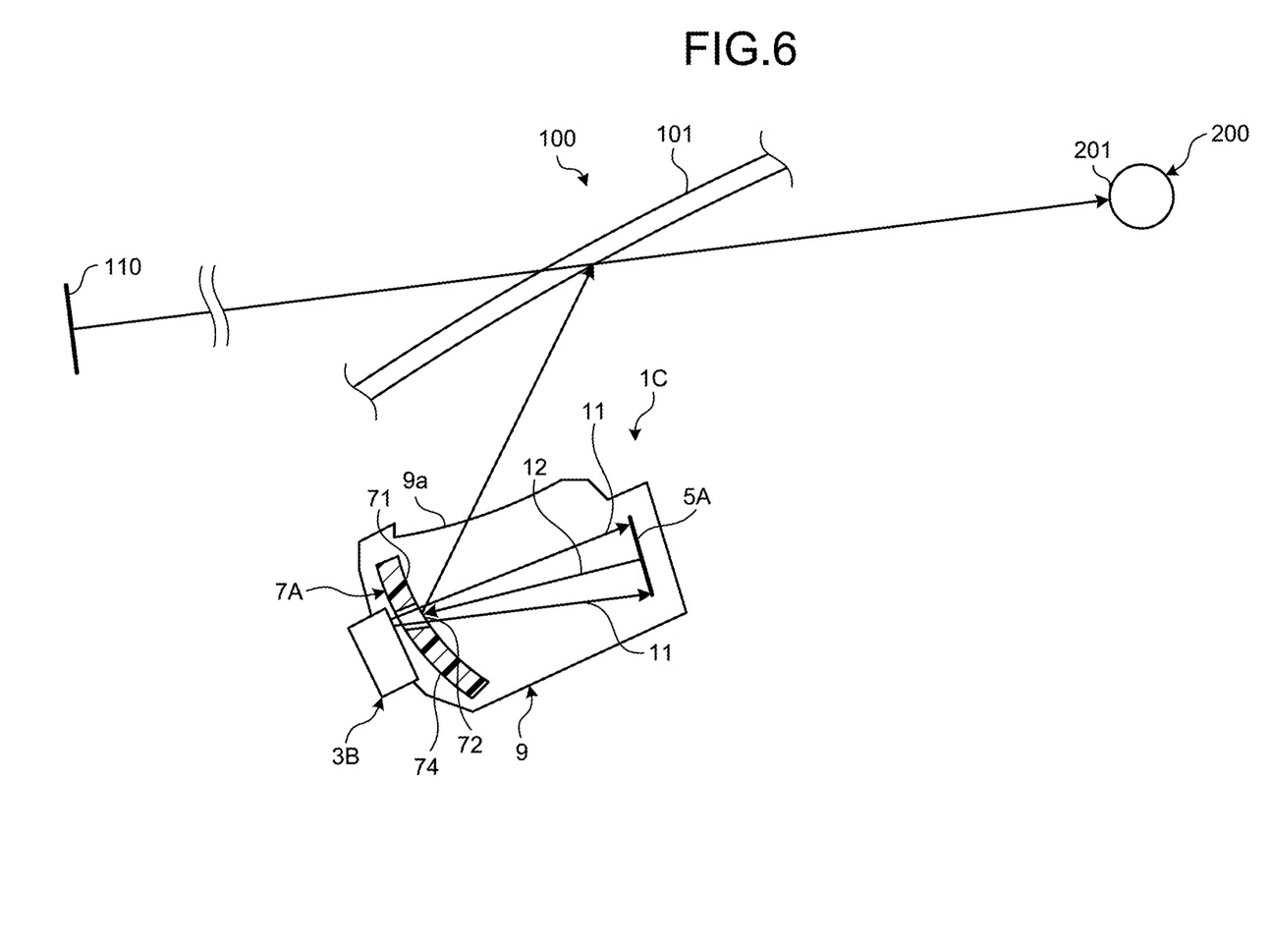
FIG. 6 is a view illustrating a schematic configuration of a vehicle display device according to a second embodiment.
Figure 7:
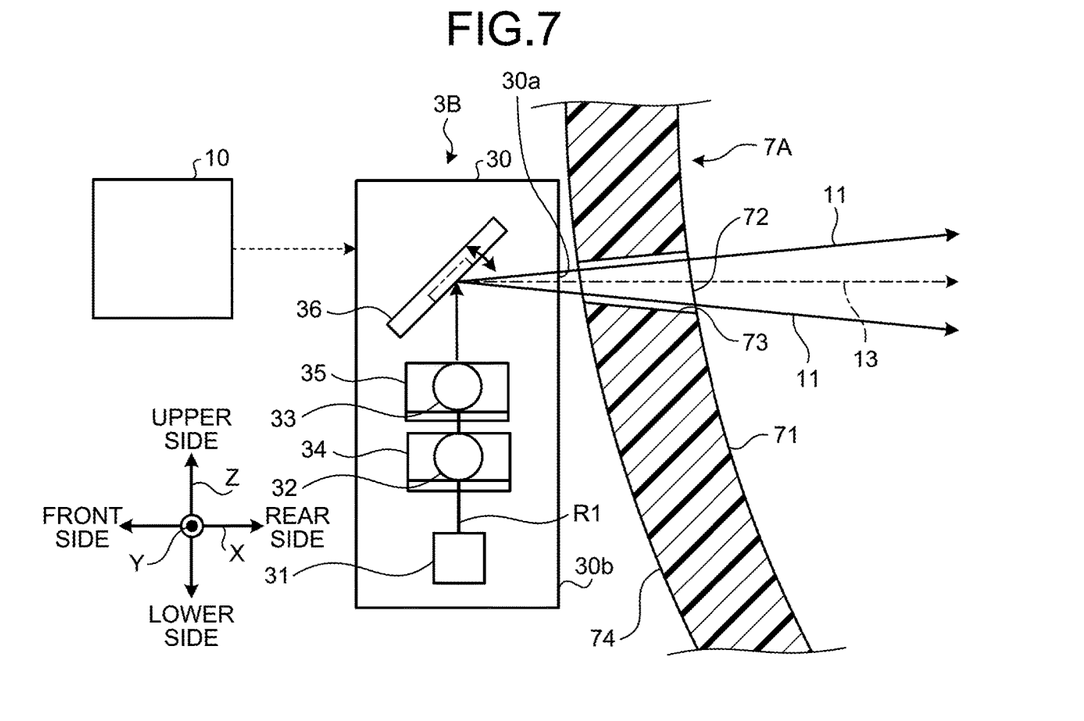
FIG. 7 is a view illustrating a schematic configuration of a projector according to the second embodiment.
Figure 8:
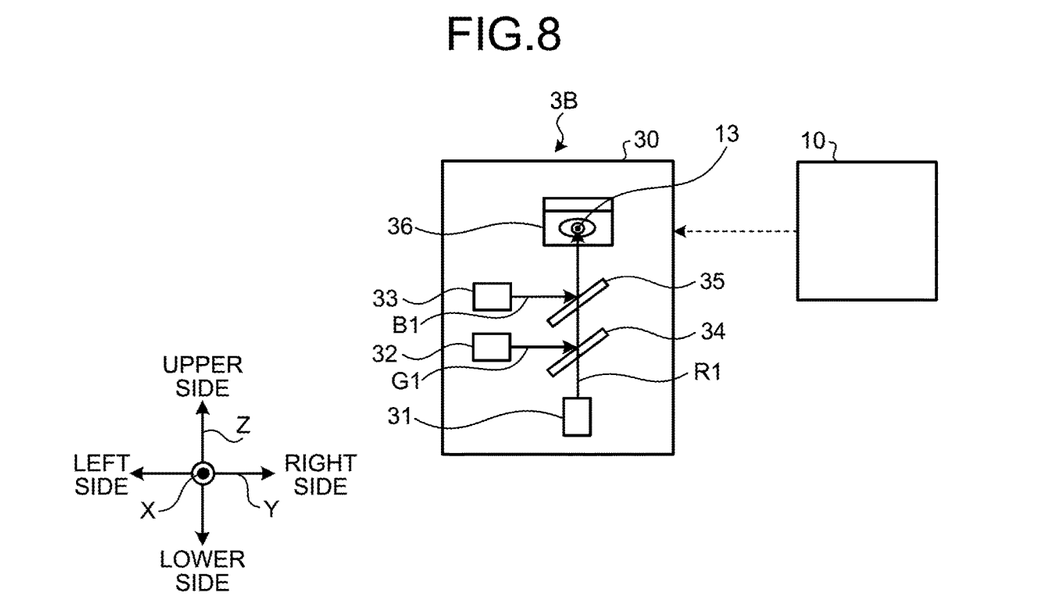
FIG. 8 is a view illustrating a schematic configuration of the projector according to the second embodiment.

Next, a vehicle display device according to a second embodiment of the invention will be described with reference to FIGS. 6 to 8. Constituent elements having the same functions as those described in the above-described first embodiment will be denoted by the same reference signs and redundant descriptions thereof will be omitted in the second embodiment. FIG. 6 is a view illustrating a schematic configuration of the vehicle display device according to the second embodiment. FIG. 7 is a view illustrating a schematic configuration of a projector according to the second embodiment. FIG. 8 is a view illustrating a schematic configuration of the projector according to the second embodiment. Incidentally, FIG. 6 illustrates a positional relationship of the respective elements when a vehicle on which the vehicle display device is mounted is viewed from the side. FIG. 8 illustrates a positional relationship of the respective elements when the projector is viewed from a direction of an optical path of display light.

A vehicle display device 1C illustrated in FIG. 6 is different from the vehicle display device 1A according to the above-described first embodiment in terms of arrangements of constituent elements of a projector 3B. Incidentally, constituent elements having the same functions as those described in the above-described first embodiment will be denoted by the same reference signs and redundant descriptions thereof will be omitted in the second embodiment.

In the projector 3B, the first light source 31 is arranged so as to emit the red laser beam toward the upper side in the Z direction as illustrated in FIGS. 7 and 8. The second light source 32 is arranged so as to emit the green laser beam toward the right side in the Y direction as illustrated in FIG. 8. The third light source 33 is arranged so as to emit the blue laser beam toward the right side in the Y direction, which is similar to the second light source 32. The first to third light sources 31 to 33 in this embodiment are arranged inside the projector 3B such that the optical axes R1, G1, and B1 of the respective red, green, and blue laser beams become a direction that intersects the optical axis 13 of the display light 11 emitted from the projector 3B.

According to the vehicle display device 1C having the above-described configuration, the first to third light sources 31 to 33 are arranged on a plane orthogonal to the emission hole 30a through which a laser beam corresponding to a display image is emitted, and thus, it is possible to shorten a length in the front-rear direction (X direction) of the projector 3B, and the same effects as those of the first embodiment are obtained.

First Modification of Second Embodiment

Figure 9:
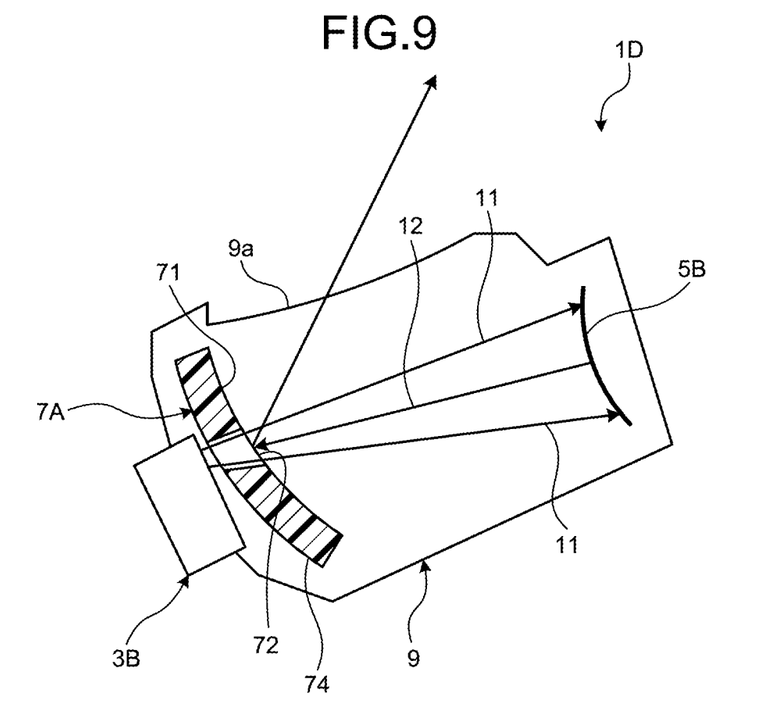
FIG. 9 is a view illustrating a schematic configuration of a vehicle display device according to a first modification of the second embodiment.

A first modification of the second embodiment will be described with reference to FIG. 9. FIG. 9 is a view illustrating a schematic configuration of a vehicle display device according to the first modification of the second embodiment.

A vehicle display device 1D according to this modification of the embodiment is different from the vehicle display device 1C in terms that the screen 5B has a curved surface formed in a convex shape toward the aspheric mirror 7A.

Here, distortion of the virtual image 110 caused by field curvature will be described. Conventionally, it has been known that an aberration generated by the windshield 101 of the vehicle 100 or an optical system in the vehicle display device is a factor of distortion occurring in the virtual image 110. In addition, three-dimensional distortion of the virtual image 110 caused by field curvature among various aberrations is a factor that degrades display quality. It is possible to correct the distortion of the virtual image 110 visually recognized by the eye point 201 to some extent by causing distortion to an image displayed on a screen of a display in the vehicle display device in advance. Meanwhile, a screen of a general display is planar so that only the planar distortion of the virtual image 110 can be corrected even if the distortion is caused in the image displayed on the screen. That is, it is difficult to perform correction in a depth direction of the image (a direction of an optical axis when projecting the image), and thus, it is difficult to correct three-dimensional distortion of the virtual image 110 caused by field curvature. Therefore, the correction by the reflection surface 71 having an aspheric shape of the aspheric mirror 7A is generally performed. However, the aspheric mirror 7A needs to correct image distortion at the windshield 101 and image distortion due to incidence and reflection angles with respect to the aspheric mirror 7A and the windshield 101 so that a burden on display distortion correction increases.

Since the screen 5B according to this modification of the embodiment has the curved surface formed in the convex shape toward the aspheric mirror 7A, it is possible to correct the image distortion at the windshield 101 and the image distortion caused by the incidence and reflection angles with respect to the aspheric mirror 7A and the windshield 101, and it is possible to reduce the burden on the display distortion correction of the aspheric mirror 7A. In addition, it is possible to increase a magnification ratio of the aspheric mirror 7A, and it is possible to reduce a size of the vehicle display device by shortening an optical path.

Second Modification of Second Embodiment

Figure 10:
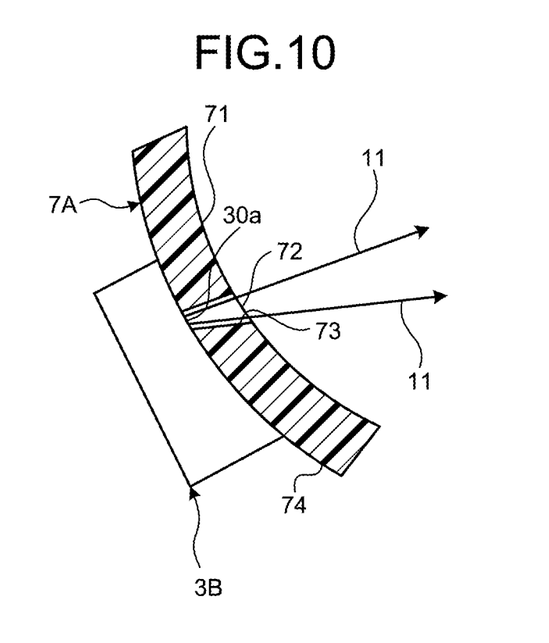
FIG. 10 is a view illustrating a projector according to a second modification of the second embodiment.

A second modification of the second embodiment will be described with reference to FIG. 10. FIG. 10 is a view illustrating a projector according to the second modification of the second embodiment.

The projector 3B according to this modification of the embodiment is different from that of the vehicle display device 1C in terms that the surface 30b is arranged in close contact with the surface 74 of the aspheric mirror 7A opposite to the reflection surface 71.

The surface 30b of the projector 3B is formed so as to have a surface shape to match a surface shape of the surface 74 of the aspheric mirror 7A, and both the surfaces are in close contact with each other. Incidentally, the surface shape of the surface 74 of the aspheric mirror 7A may be formed to match the surface shape of the surface 30b of the projector 3B. The surface 30b and the surface 74 may be bonded to each other or fastened by a fastening member (not illustrated).

According to the vehicle display device having the above-described configuration, it is possible to prevent dust and trash from entering the interior of the housing 30 from a gap between the projector 3B and the aspheric mirror 7A via the emission hole 30a of the projector 3B.

Third Modification of Second Embodiment

Figure 11:
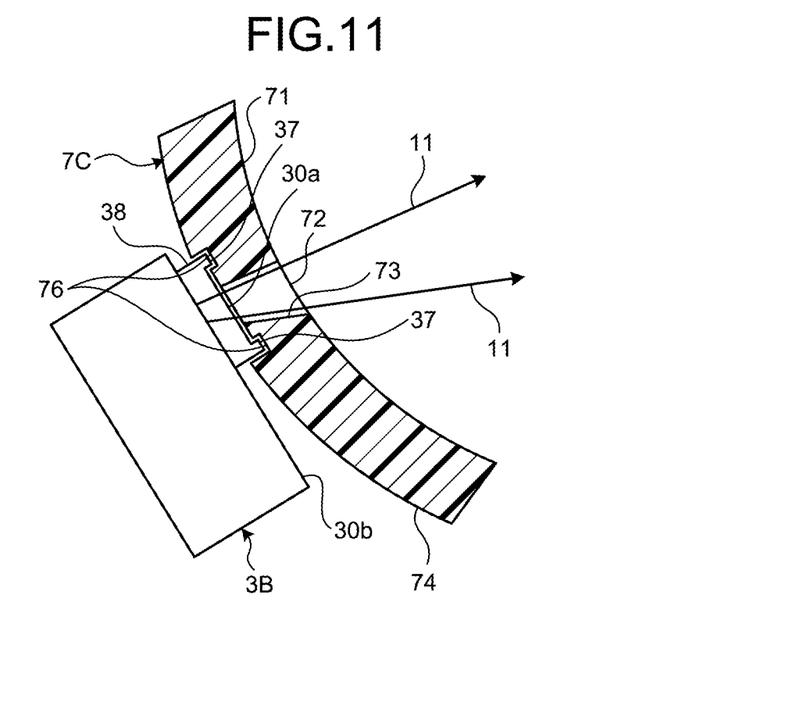
FIG. 11 is a view illustrating a projector according to a third modification of the second embodiment.

A third modification of the second embodiment will be described with reference to FIG. 11. FIG. 11 is a view illustrating a projector according to the third modification of the second embodiment.

The projector 3B according to this modification of the embodiment is different from that of the vehicle display device 1C in terms of being fitted to an aspheric mirror 7C.

The projector 3B has a protruding portion 38 including the emission hole 30a on the surface 30b of the housing 30. A convex portion 37 is formed so as to surround the emission hole 30a in the protruding portion 38. The convex portion 37 is a first convex portion. The aspheric mirror 7C has the through-hole 73 at a position facing the emission hole 30a, and a concave portion 76, that is fitted to the convex portion 37, is formed so as to surround the through-hole 73. The concave portion 76 is a first concave portion.

Incidentally, a concave portion (second concave portion) may be formed in the protruding portion 38 of the projector 3B so as to surround the emission hole 30a, and a convex portion (second convex portion), that is fitted to the concave portion, may be formed in the aspheric mirror 7C so as to surround the through-hole 73.

In addition, the convex portion 37 may be formed on the surface 30b of the housing 30 so as to surround the emission hole 30a in the projector 3B, and a concave portion, that is fitted to the convex portion 37, may be formed so as to surround the through-hole 73 in the aspheric mirror 7C. In addition, a concave portion may be formed on the surface 30b of the housing 30 so as to surround the emission hole 30a in the projector 3B, and a convex portion, that is fitted to the concave portion, may be formed so as to surround the through-hole 73 in the aspheric mirror 7C.

The projector 3B and the aspheric mirror 7C are fitted to each other by the concave and convex portions according to a vehicle display device having the above-described configuration. Thus, even if there is a gap between the projector 3B and the aspheric mirror 7C, this gap has a labyrinth structure so that it is possible to more effectively prevent dust and trash from entering the emission hole 30a.

Fourth Modification of Second Embodiment

Figure 12:
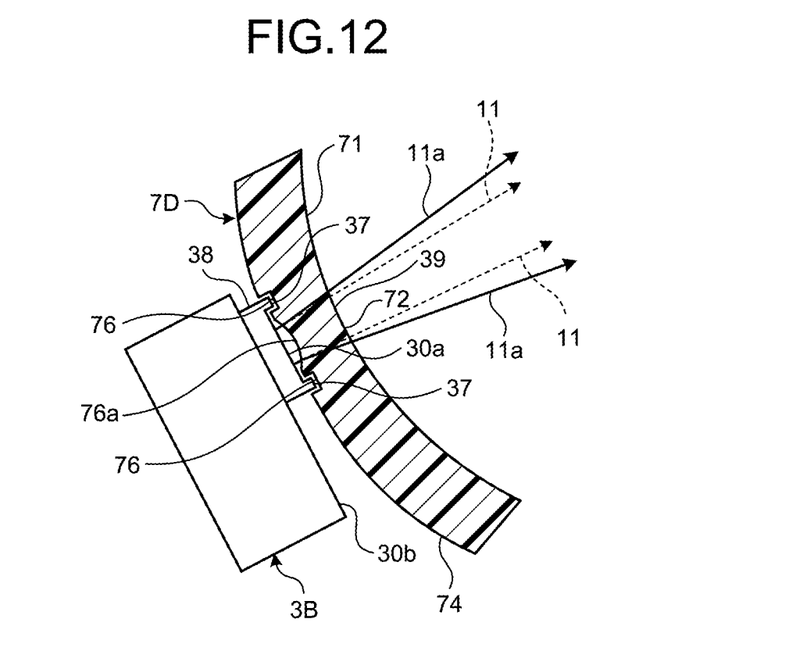
FIG. 12 is a view illustrating an aspheric mirror according to a fourth modification of the second embodiment.

A fourth modification of the second embodiment will be described with reference to FIG. 12. FIG. 12 is a view illustrating an aspheric mirror according to the fourth modification of the second embodiment.

An aspheric mirror 7D according to this modification of the embodiment is different from that of the vehicle display device 1C in terms that the through-hole 73 is not provided, and the concave portion 76 has a curved surface that is curved in a concave shape toward the convex portion 37 on a surface 76a which faces and is fitted to the convex portion 37.

The aspheric mirror 7D has a light guide body 39 in the non-reflection area 72, and the light guide body 39 is configured to transmit light. Display light 11a emitted from the projector 3B passes through the non-reflection area 72 and reaches the screen 5A. The display light 11a, which has been emitted from the emission hole 30a of the convex portion 37, passes through the surface 76a of the concave portion 76 in the fitting state of the concave portion 76 and the convex portion 37.

The projector 3B and the aspheric mirror 7D are fitted to each other by the concave and convex portions according to a vehicle display device having the above-described configuration. Thus, even if there is a gap between the projector 3B and the aspheric mirror 7D, this gap has a labyrinth structure so that it is possible to more effectively prevent dust and trash from entering the emission hole 30a, which is similar to the third modification of the second embodiment described above. In addition, the display light 11 (the broken line in the drawing) emitted from the projector 3B is refracted by the concave-shaped curved surface of the concave portion 76 to form the display light 11a (the solid line in the drawing) so that it is possible to enlarge a projection range. For example, the projection range is enlarged in the vertical direction (so-called a sub-scanning direction) of the display image.

Incidentally, each of the vehicle display devices 1A, 1B, 1C, and 1D projects the display image on the windshield 101 and displays the virtual image 110 in front of the eye point 201 of the vehicle 100 in the above-described embodiments and modifications thereof, but may be configured to project the display image on, for example, a combiner or the like without being limited thereto.

In addition, each of the projectors 3A and 3B is the laser scanning-type projector using the MEMS mirror in the above-described embodiments and modifications thereof, but may be an LCD-type projector without being limited thereto.

In addition, each of the projectors 3A and 3B is housed in the housing 9 so as to be partially exposed to the outside of each of the vehicle display devices 1A to 1D in the above-described embodiments and modifications thereof, but may be housed in the housing 9 as a whole without being limited thereto.

The content disclosed in each of the above-described embodiments and modifications can be executed in an appropriately combined manner. Incidentally, similar effects can be expected by projection from a projector provided near a lower side of an aspheric mirror.

According to the vehicle display device of the embodiments, the effect of enabling the easy reduction in size is obtained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
a projector that emits display light corresponding to a display image to be visually recognized by a driver of a vehicle;
a projected member on which the display image corresponding to the display light emitted from the projector is projected and that reflects the display light; and
a reflection mirror that reflects reflection light of the display light reflected by the projected member toward a windshield of the vehicle, wherein
the reflection mirror is provided with a non-reflection area on a part of a reflection surface that reflects the reflection light toward the windshield,
the projector is arranged at a position facing the projected member with the reflection mirror interposed therebetween such that the display light passes through the non-reflection area and is directed to the projected member,
the projector has a portion formed so as to surround an emission hole through which the display light is emitted, and
the reflection mirror has a through-hole, that penetrates from a surface opposite to the reflection surface toward the reflection surface, at a position facing the emission hole, and a portion that is fitted with the portion of the projector is formed so as to surround the through-hole, and the portion of the projector is one from among a convex portion and a concave portion, and the portion of the reflection mirror is another from among the convex portion and the concave portion.

2. The vehicle display device according to claim 1, wherein the projector has three light sources that emit laser beams having mutually different wavelengths, and the three light sources are arranged on a plane orthogonal to the emission hole through which a laser beam corresponding to the display image is emitted.

3. The vehicle display device according to claim 1, wherein
the projected member has a plane or a curved surface formed in a convex shape toward the reflection mirror.

4. The vehicle display device according to claim 3, wherein
the projected member has a plane or a curved surface formed in a convex shape toward the reflection mirror.

5. The vehicle display device according to claim 1, wherein
the projector has a surface having the emission hole through which the display light is emitted, the surface being arranged in close contact with a surface of the reflection mirror opposite to the reflection surface.

6. The vehicle display device according to claim 3, wherein
the projector has a surface having the emission hole through which the display light is emitted, the surface being arranged in close contact with a surface of the reflection mirror opposite to the reflection surface.

7. The vehicle display device according to claim 3, wherein
the projector has a surface having the emission hole through which the display light is emitted, the surface being arranged in close contact with a surface of the reflection mirror opposite to the reflection surface.

8. The vehicle display device according to claim 1, wherein
the reflection surface of the reflection mirror is a contiguous surface that includes the non-reflection area thereon.

9. The vehicle display device according to claim 1, wherein
the portion of the projector is the convex portion and the portion of the reflection mirror is the concave portion.

10. The vehicle display device according to claim 1, wherein
the portion of the projector is the concave portion and the portion of the reflection mirror is the convex portion.

* * * * *